United States Patent [19]
Arquié

[11] Patent Number: 5,649,133
[45] Date of Patent: Jul. 15, 1997

[54] METHOD FOR COLLISION AVOIDANCE FOR USER INTERFACE FOR OBJECT WITH MULTIPLE HANDLES

[75] Inventor: Louis M. Arquié, San Jose, Calif.

[73] Assignee: Apple Computer, Inc., Cupertino, Calif.

[21] Appl. No.: 489,851

[22] Filed: Jun. 13, 1995

[51] Int. Cl.$^6$ ................................................. G06F 3/00
[52] U.S. Cl. ................................................. 395/348; 395/342
[58] Field of Search ....................... 395/326, 333, 395/334, 339–343, 348–351; 345/118, 119, 120, 121, 123, 125, 127, 131

[56] References Cited

U.S. PATENT DOCUMENTS

| | | | |
|---|---|---|---|
| 5,227,771 | 7/1993 | Kerr et al. | 395/342 X |
| 5,283,864 | 2/1994 | Knowlton | 395/334 X |
| 5,305,435 | 4/1994 | Bronson | 395/342 X |
| 5,426,729 | 6/1995 | Parker | 395/348 X |
| 5,487,143 | 1/1996 | Southgate | 395/342 |
| 5,491,781 | 2/1996 | Gasperina | 395/341 |
| 5,515,496 | 5/1996 | Kaehler et al. | 395/334 |
| 5,559,946 | 9/1996 | Porter | 395/349 |
| 5,570,281 | 10/1996 | Berry | 395/348 X |
| 5,586,244 | 12/1996 | Berry et al. | 395/340 |
| 5,588,108 | 12/1996 | Kumar et al. | 395/348 |

*Primary Examiner*—Joseph H. Feild
*Attorney, Agent, or Firm*—David J. Larwood

[57] ABSTRACT

A user interface and corresponding algorithms allow a user to resize an object by manipulating a handle. In particular, the interface provides a large handle which is clearly oriented to suggest a direction of movement merely by its appearance. Each handle is noticeably wider than its associated edge, and oriented towards the interior of the object to clarify that this object is active. If one handle is moved towards the other handle, at some point, the handles would come into contact with each other. Since each handle is noticeably wider than its associated edge, this potential collision may occur at some distance from either edge, possibly limiting the range of motion of the edge. At least one, and preferably both, handles are displaced along each handle's respective edge so that the handles do not collide and so each handle can be brought closer to the opposite edge.

5 Claims, 8 Drawing Sheets

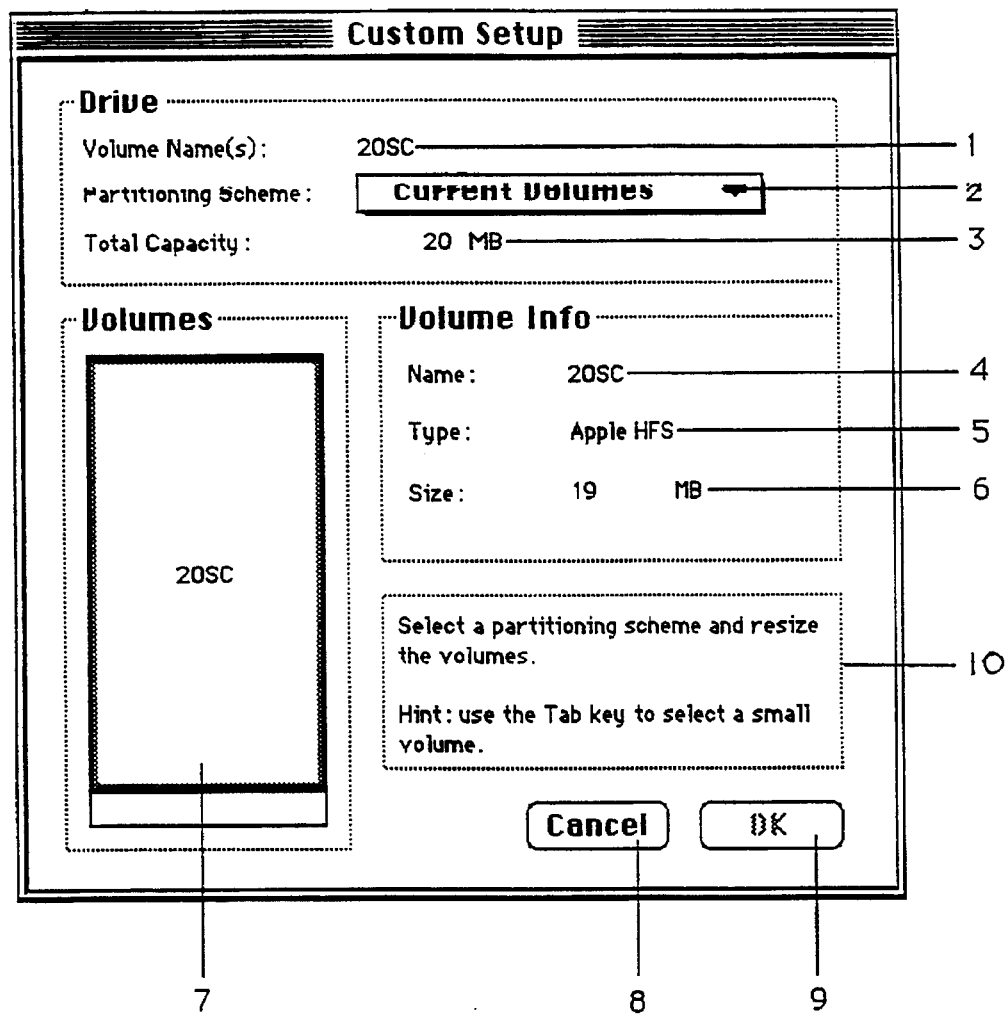
FIGURE 4
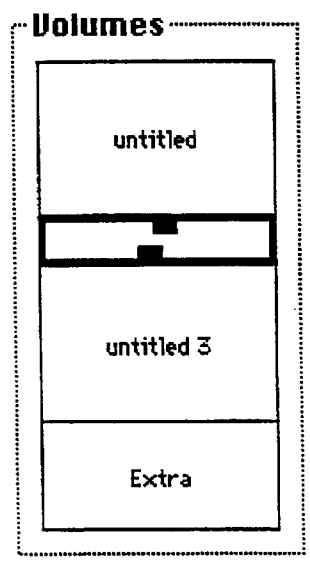 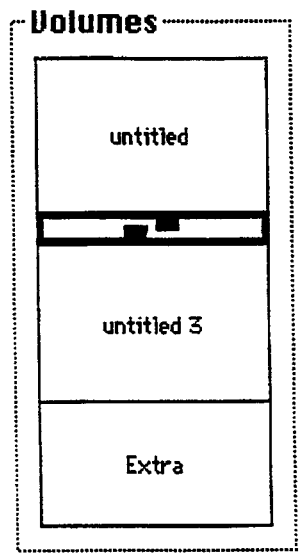
FIGURE 5A  FIGURE 5B

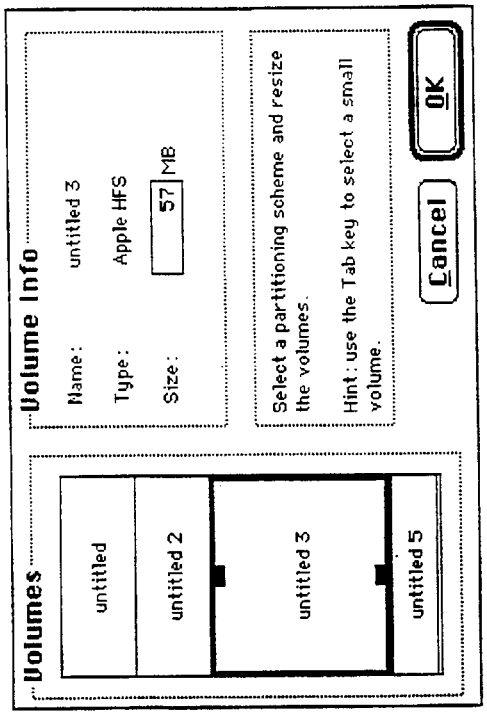
FIGURE 9A
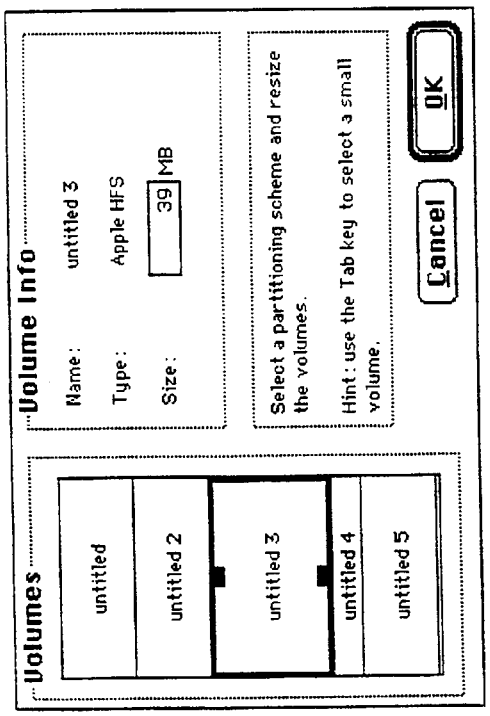
FIGURE 9B
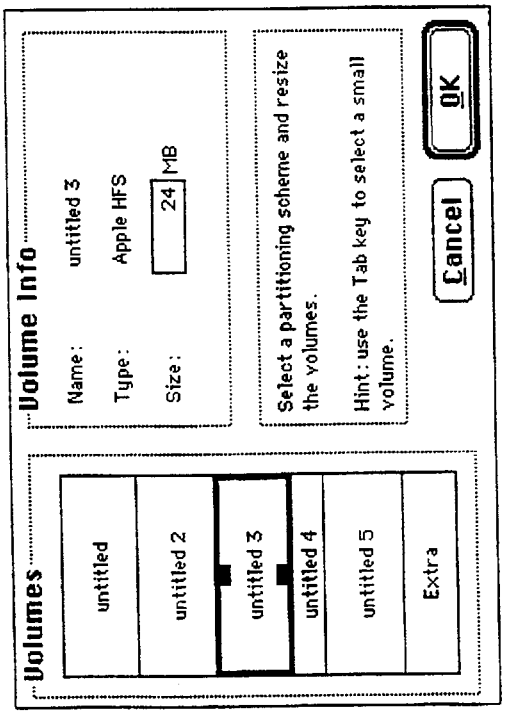
FIGURE 9C
FIGURE 9D

METHOD FOR COLLISION AVOIDANCE FOR USER INTERFACE FOR OBJECT WITH MULTIPLE HANDLES

FIELD OF THE INVENTION

This invention relates to the field of providing user interface for resizing an object using multiple handles. More particularly, this invention relates to a method for providing two or more handles which project into the interior of an object. As the object is reduced in size, the handles move as needed to avoid touching each other.

BACKGROUND OF THE INVENTION

There a great number of instances in computer user interfaces where an object is represented by a bounding box. In many instances, handles are provided for manipulating the bounding box. Common places for such handles are at each corner and often at the mid-point of each side. However, it is not always intuitive for a user to understand how to manipulate such handles.

There are many instances where there is a need to divide a fixed space into subdivisions. In general, this arises in a wide variety of fields. One field of particular interest is partitioning computer storage media, such as a hard disk or removable media such as a Syquest or Bernoulli cartridge, magneto-optic disk, recordable CD, or other media. This problem becomes more significant as the storage capacity of such devices continues to increase. This problem also arises in other fields, such as real estate (land, such as subdevelopments), architecture (e.g. allocating space in a building), page layout (publishing) and other graphic arts, as well as other fields.

Traditionally this subdividing is done in a variety of ways, but many of these ways share some common characteristics. The number of subdivisions or the minimum size of a subdivision is generally selected so, as a first approximation, the space can be divided into equal subdivisions based on one of these limitations. For example, if a space is to be divided four ways, then the space can be divided into quarters (a page divided top to bottom and left to right, or, alternatively, into four horizontal segment of equal size). Certain situation-specific criteria may then call for adjustment of these sizes. For example, in partitioning a hard disc, certain functions may be allocated larger or smaller subdivisions. A 2 gigabyte drive might be divided into two 650 megabyte partitions, each as a scratch space for assembling a CD, and two 350 megabyte (or one 700 megabyte) partitions for applications, operating system software, and the like. The variety of situations and partitioning schemes is essentially limitless.

A number of applications are in use today for using a computer to set the size of something. In a typical storage-media partitioning application, the application prompts the user to select a device to partition, then provides some basic information about the device, including the size of the device and sometimes additional information (e.g. the nature of the media, manufacturer, size of logical blocks, version of driver software). The application prompts the user to define the size of (and usually name) a first partition, then reports how much space is left. If sufficient space remains, the application prompts the user to define a second partition, and so on, until the user has defined as many partitions as desired, or until the available space is fully allocated. In most applications, the actual partitioning is not performed until the user has allocated space to extent desired or possible.

This process works well if the user has a good idea in advance as to how the available space should be allocated. However, if the user allocates space for a first partition, then for a second, then realizes that the first partition is too large or too small and needs to be adjusted, the user interface breaks down. In many applications, the user must delete the first partition, then create an alternate first partition with the correct size. Choosing the size to allocate is sometimes difficult, particularly if there are several partitions and trade-offs are required in order to allocate space efficiently.

Other applications also are in use for using a computer to set the size of something. For example, in a page layout program, a first text section may be allocated the top half of the first column on a page, and a second text section be allocated the bottom half of the first column and all of the second column. To modify the size of the allocation for the first text section requires multiple steps, which depend on whether the user is expanding or reducing the allocation. If the first text section will be given less space, the user must first reduce the size of the first text allocation, then increase the size of the second text allocation to remove the free space. If the first text section will be given more space, the user must first reduce the size of the second text section to allow room for the first text section, then enlarge the first text section. In some instances, depending on the feedback available from the program, it may require several iterations to correctly allocate the available layout space. These principles apply in other programs as well, such as fitting subunits into a fixed space, such as modular furniture systems into a building floor plan or housing units into a development.

There are other applications that provide various resizing characteristics but do not face the constraints of interest here. In one notable example, many spreadsheets allow reformatting by increasing the size of a row or column by simply moving one boundary, typically the lower (for a row) or right (for a column) boundary. This change is reflected in the entire row or column. This system, however, does not have to face a fixed size constraint and so as one row or column is increased or decreased in size, and subsequent rows or columns are shifted in or out by the same amount and the total space of the spreadsheet increases or decreases by that same amount.

A different variety of partitioning is seen in the prior art in the form of a split-pane window. This is commonly found in word processors and spreadsheets where the user may want convenient, simultaneous access to two disparate parts of a document. This also differs from the present invention in a number of ways. First, the split allows a view into different portions of the whole document, but does not represent or lead to a partitioning of the entire document. Second, although this does lead to a partitioning of the display window, that display window also can be enlarged or shrunk, typically by applying a sizing command, so the window does not represent an object which is necessarily limited in size.

Turning to handles for the bounding rectangle of a partition or other object, one problem with past solutions is that the handle is relatively small, generally intended to be merely an enlarged portion of the line or intersection that handle controls. A user may need some practice or some historical association with other interfaces to understand that the handle is something to be selected and held, then manipulated in order to effect some change on the corresponding object.

SUMMARY OF THE INVENTION

The present invention provides a user interface and corresponding algorithms allowing a user to resize an object by manipulating a handle. In particular, the interface provides a large handle which is clearly oriented to suggest a direction of movement merely by its appearance.

In particular, this invention provides for a mechanism of collision avoidance where when two handles on opposite sides of an object are brought into proximity, one or both handles move to avoid hitting the other handle. In one common form of object, a rectangle when activated is displayed with two handles, approximately at the center of each of two edges on opposite sides of the rectangle. Each handle is noticeably wider than its associated edge, and oriented towards the interior of the object to clarify that this object is active. Manipulating a handle allows the edge to be moved in a direction perpendicular to the edge, with the rectangle changing shape as needed to remain connected.

If one handle is moved towards the other handle, at some point, the handles would come into contact with each other. Since each handle is noticeably wider than its associated edge, this potential collision may occur at some distance from either edge, possibly limiting the range of motion of the edge. This invention solves this by displacing at least one, and preferably both, handles along each handle's respective edge so that the handles do not collide and so each handle can be brought closer to the opposite edge.

One object of the present invention is to provide a graphical interface to clearly indicate to a user how to manipulate a graphic object.

Another object of this invention is to provide a mechanism for collision avoidance where when one handle is brought near another handle, at least one handle is moved from its nominal motion or path so as to avoid hitting the other handle.

This and other objects and advantages of the invention, as well as the details of an illustrative embodiment, will be more fully understood from the following specification and drawings.

BRIEF DESCRIPTION OF THE DRAWINGS

FIG. 4 illustrates an alternative view of FIG. 3 with one large partition and a small amount of unallocated space.

FIGS. 5A and 5B illustrate the graphical handles used to manipulate the partition size, showing in particular in FIG. 5B how the handles move to the side to avoid collision.

FIGS. 9A, 9B, 9C and 9D illustrate the effect of adjusting the lower handle of an active partition.

DESCRIPTION OF THE PREFERRED EMBODIMENTS

The present invention provides a user interface and corresponding algorithms allowing a user to resize an object by manipulating a handle. In particular, the interface provides a large handle which is clearly oriented to suggest a direction of movement merely by its appearance. In particular, this invention provides for a mechanism of collision avoidance where when two handles on opposite sides of an object are brought into proximity, one or both handles move to avoid hitting the other handle.

In one common form of object, a rectangle when activated is displayed with two handles, approximately at the center of each of two edges on opposite sides of the rectangle. Each handle is noticeably wider than its associated edge, and oriented towards the interior of the object to clarify that this object is active. Manipulating a handle allows the edge to be moved in a direction perpendicular to the edge, with the rectangle changing shape as needed to remain connected.

If one handle is moved towards the other handle, at some point, the handles would come into contact with each other. Since each handle is noticeably wider than its associated edge, this potential collision may occur at some distance from either edge, possibly limiting the range of motion of the edge. This invention solves this by displacing at least one, and preferably both, handles along each handle's respective edge so that the handles do not collide and so each handle can be brought closer to the opposite edge.

The present invention is particularly useful when used in conjunction with a user interface and corresponding algorithms allowing a user to partition a fixed total space and resize contiguous objects within that space either graphically or with the use of an editable numeric field. The objects share a fixed total space, i.e. an object cannot be resized without changing the size of at least one other object. The list of objects can also include one or more "free-space objects", each of which stores unused or unallocated space.

Figure 6:
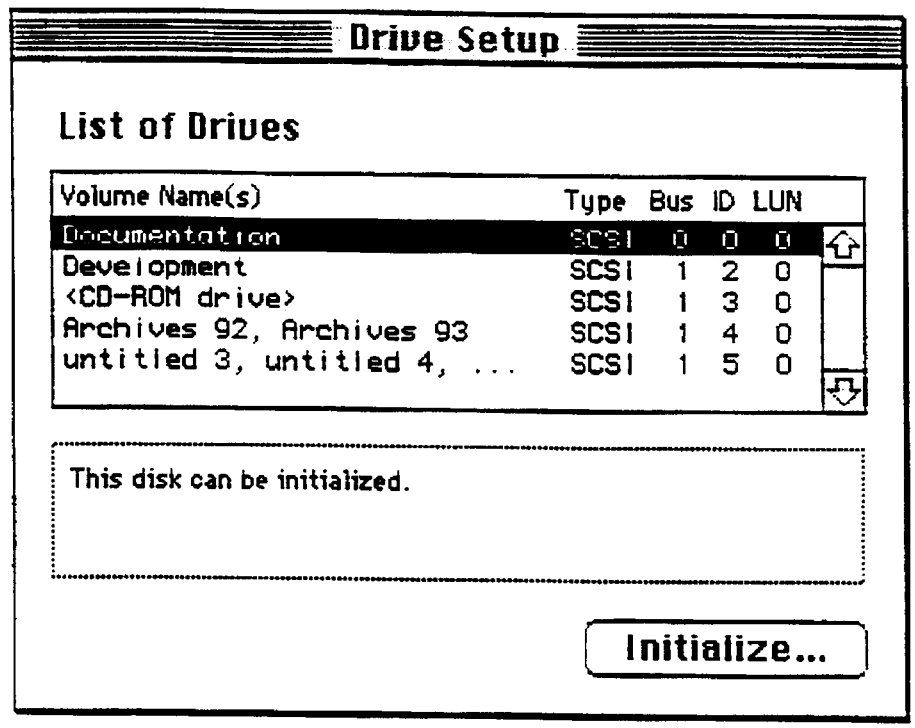
FIG. 6 illustrates the initial application window presented to the user when beginning a preferred embodiment of the application.
Figure 7:
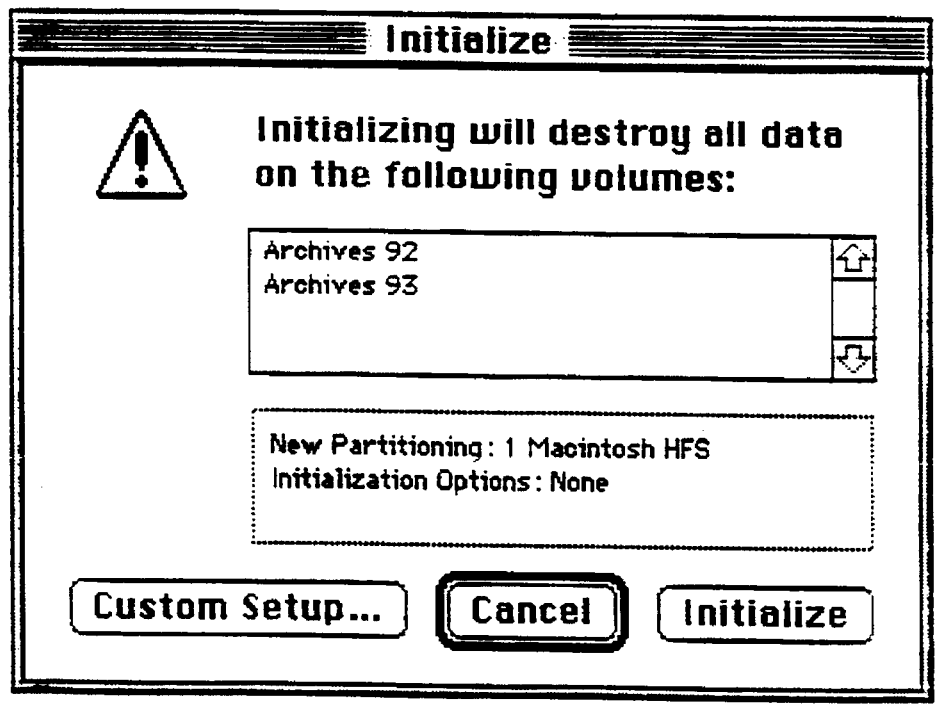
FIG. 7 illustrates the window that is presented if the user elects to initialize a selected volume.

In a preferred embodiment, when the application is launched, it opens the main window, Drive Setup, which remains open until the user quits the application. The application opens other windows/dialog boxes on top of the main window, as needed. The application can scan connected devices and report useful information to the user. Referring to FIG. 6, this information may include the name and connection ID of any connected devices, the type of certain devices (such as a scanner or a CD-ROM drive, each of which is recognized but cannot be formatted with this application). The application may also report the type of bus connection, e.g. SCSI, ATA/IDE.

The user can select a drive of interest and initiate a sequence to initialize the drive. Referring to FIG. 6, the application can present a warning message to alert the user that repartitioning involves initializing the drive, which will destroy all data on the drive. This message also informs the user that the default initialization is to format the entire drive as unit, with minimal partitioning. However, the user may prefer to select "Custom Setup . . . " and adjust the partitioning.

Referring to FIG. 4, one preferred display includes five main components: information on the selected disk; a graphical representation of the partitions on the disk; information on the selected partition; a message box; and 2 button controls. For information on the selected disk, this dialog box lists the volume name(s) 1 found on the selected drive. If a single drive is formatted as multiple partitions, then multiple names will appear here. If the drive is minimally partitioned, then a single volume name will appear here. The display lists a selected partitioning scheme 2, preferably as a pop-up menu. The display also lists the total capacity of the drive 3 and two button controls—action buttons for "Cancel" 8 (exit without changing the current formatting) and "OK" 9 (proceed).

A graphical representation of the partitions on the disk in the form of map 7 of the available volumes is presented. This map may take different forms. Compare FIGS. 1, 3 and 4. Here, 19 of the available 20 megabytes are occupied by the volume "20SC" 7A and the space 7B is both unallocated and unnamed. This unallocated space 7B can be considered as a "free-space" object. There are some additional regions allocated on the media, including a partition map, one or more driver partitions, in addition to the volume partition(s) and free-space object partition. These regions can be identified but not modified as the user scans through the volumes by tapping the "tab" key. A "Volume Info" section provides information on a selected partition and lists the name 4 of a selected volume (by default the first resizable partition), the type 5 of formatting and the formatted size 6 of the partition. In a preferred embodiment, a volume may be formatted as Apple HFS or as Apple ProDOS, but one skilled in the art can extend these principles to utilize any desired formatting. The display also includes message box 10.

Figure 2:
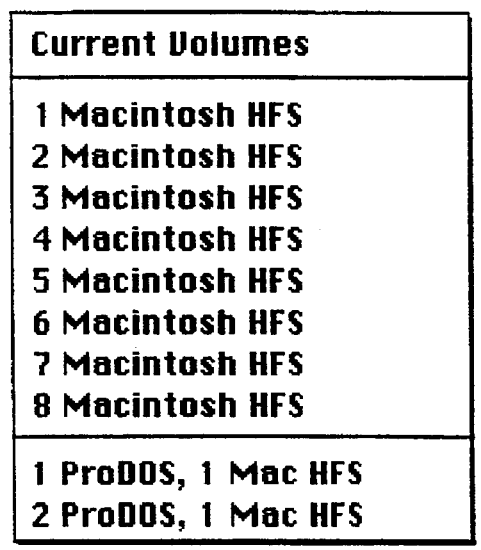
FIG. 2 illustrates a popdown menu with one preferred list of options for formatting.

Referring to FIGS. 2 and 4, when the "Custom Setup" window is opened, the pop-up menu selection is "Current Volumes" except if the user has already used this window for the selected drive. In this last case, the previous choices of the user are restored in the disk information, the graphical representation and the partition information fields. In some instances, the list may be modified. For example, in one preferred implementation, if the disk selected in the Drive Setup window is removable, the last two items of the pop-up menu are dimmed since the removable driver does not support ProDOS volumes.

When the user selects a new partitioning scheme, the graphical representation is replaced with the default configuration of the chosen partitioning scheme, the first resizable partition is selected and information about that partition is displayed in the partition information field.

Figure 8:
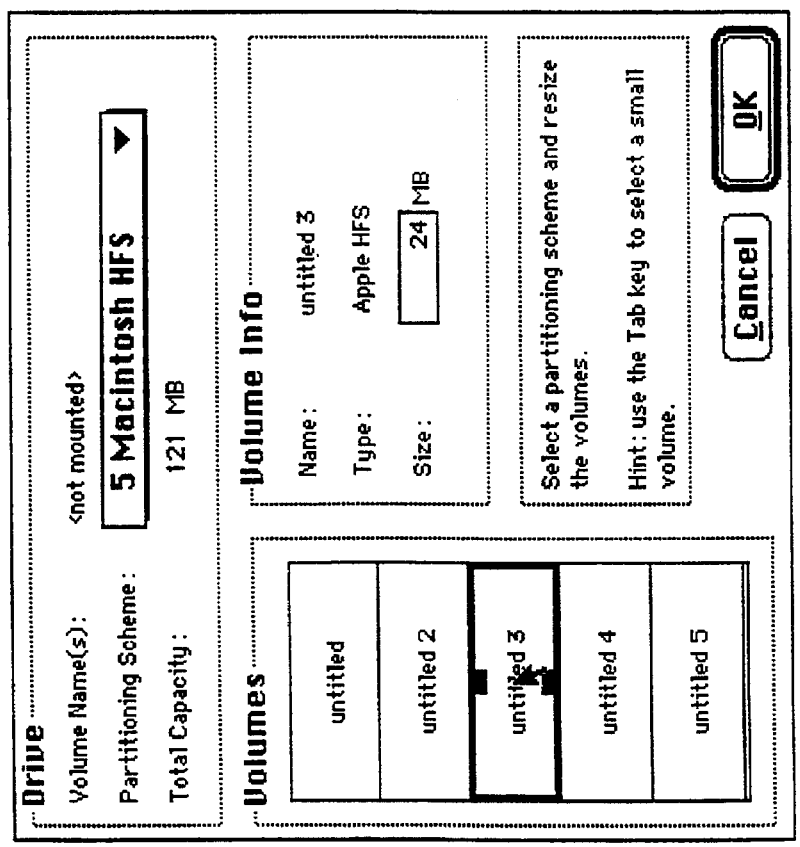
FIG. 8 illustrates a default partitioning scheme.

The graphical representation is a proportional display of the partitions on the selected disk. The partitions are shown as rectangles. The height of the rectangle is proportional to the partition size. Referring to FIG. 8, a 121 megabyte removable magneto-optic drive cartridge when divided into five HFS partitions is initially allocated as five equal 24 megabyte partitions, with 5 kilobytes as a free-space object.

Figure 1:
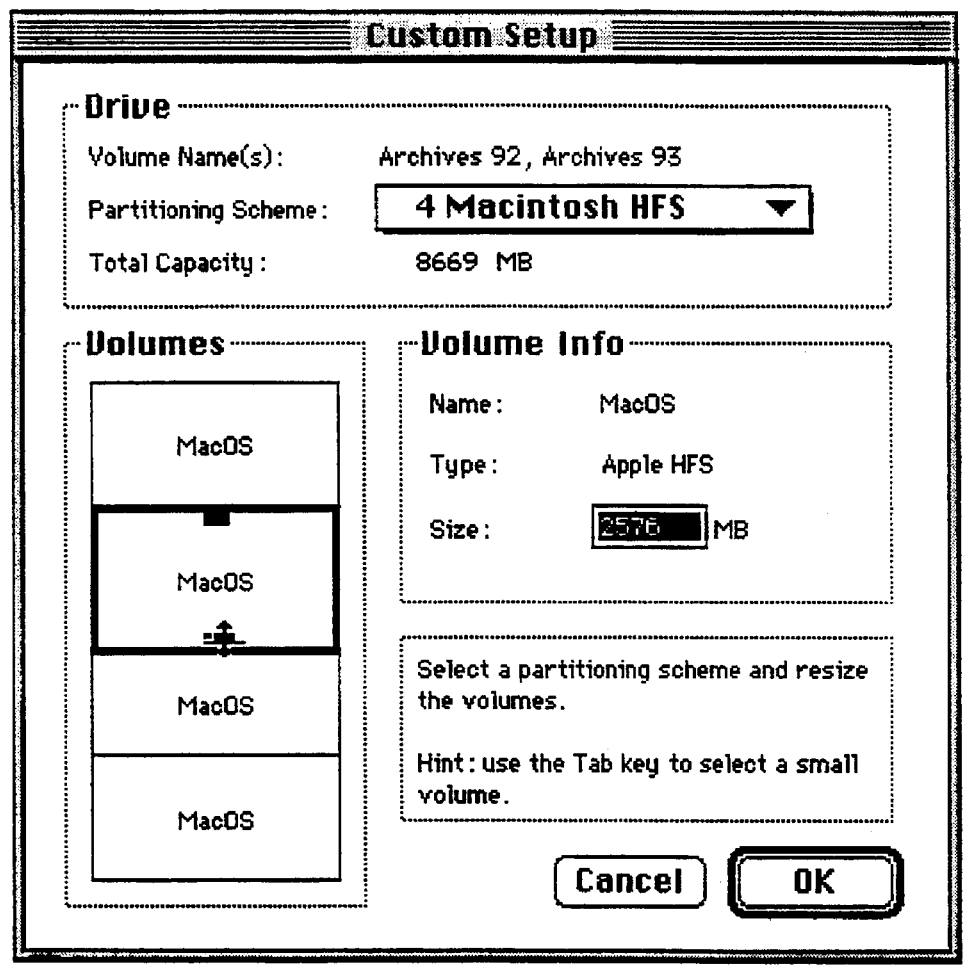
FIG. 1 illustrates a user dialog box presenting information about a computer storage device and providing for user-interaction to modify or approve a specific allocation of space for partitions on the storage device.

The selected partition is framed with a 3-pixel wide black line. If the selected partition is resizable, two handles appear to guide the user into resizing the partition (FIG. 1). The top-most resizable partition has only one resizable handle (see FIG. 12B).

Figure 3:
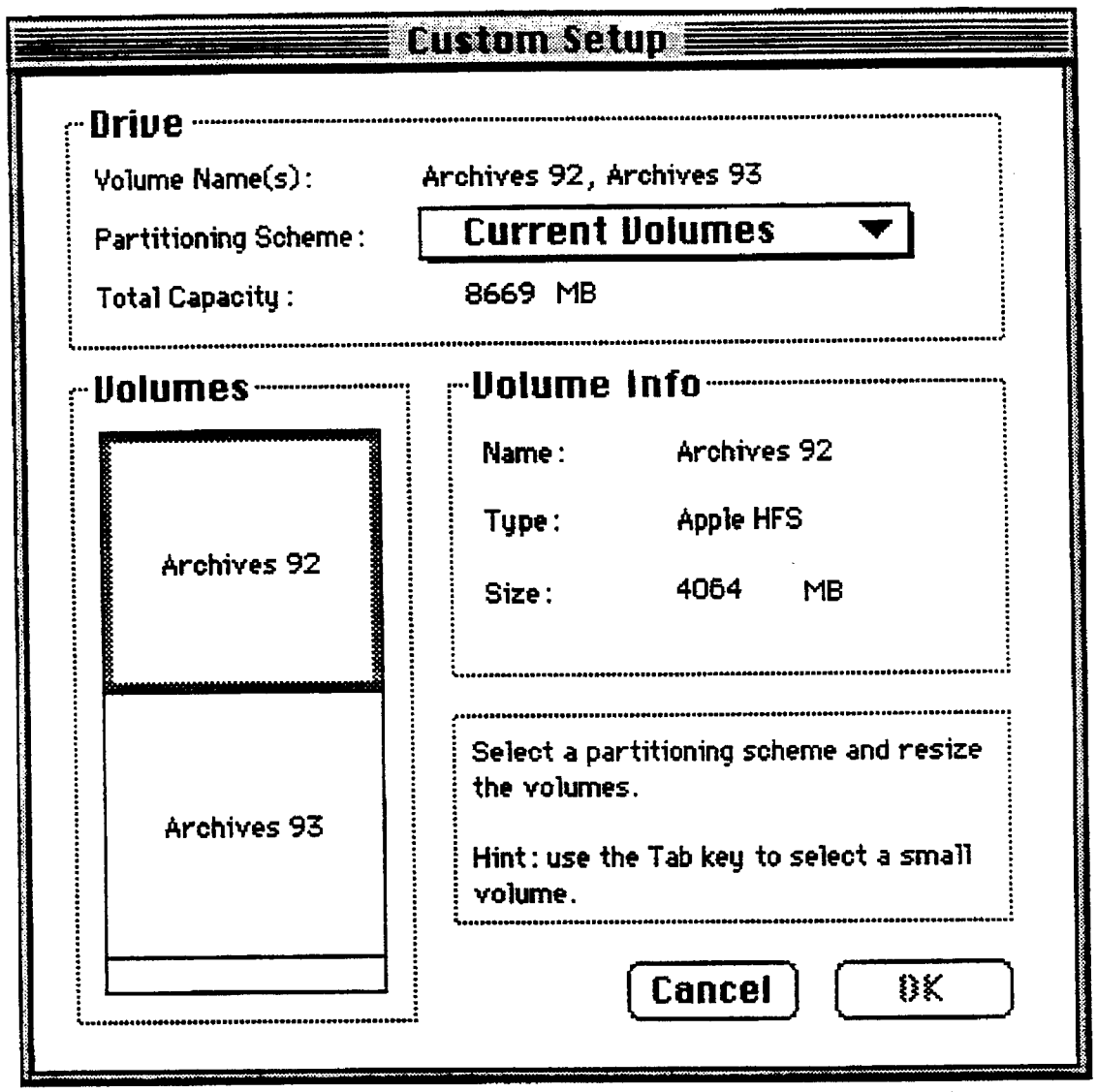
FIG. 3 illustrates the user dialog box of FIG. 1 but reporting the current partitioning rather than setting up a new partitioning.

If the "Current Volumes" item is selected in the pop-up menu, the rectangle of the selected partition is framed with a gray pattern (FIG. 3). If the disk does not contain any partition a "<no volumes>" string is displayed in the center of the graphical representation.

The selected object is highlighted with a thick frame and two handles are drawn to indicate to the user the possibility of resizing the object by dragging one of the handles.

If the user moves the cursor over one of the handles, a custom cursor is drawn to reinforce the indication of a resizing capability and to suggest that not only one object is resized but also that the divider between two consecutive objects is moved (FIG. 1). Any change in the size of the object is reflected in the numeric field 6. However, the numeric field 6 reflects only the size of the selected volume and any changes in an adjacent volume must be estimated by eye. The user can, however, select the adjacent volume for a specific numerical reading.

When the object's dimension is close to or smaller than twice the handle size, the handles are offset to prevent them from overlapping. Referring to FIGS. 5A and 5B and comparing FIG. 1, when the handles are well spaced, each handle is presented centered on its corresponding horizontal line. However, as the size of the bounding rectangle decreases, at some threshold, the handles begin to move in an offset direction. In one preferred embodiment, the threshold distance is three times the handle thickness or about 18 pixels (three times 6 pixels). In one preferred embodiment the direction of offset is clockwise (top handle to the right, bottom handle to the left). The amount of offset increases as needed so the handles will clear each other as they pass. In one preferred embodiment, the amount of offset is proportional to the proximity of the top and bottom boundaries, with a maximum offset reached when the closest edges of the handles are separated by at least three pixels.

One skilled in the art will recognize that other displacement motions might be possible which follow the teachings of this invention. For example, a handle might move transversely to the controlled edge, in other words, passing through the line so than an interior handle becomes an exterior handle when needed to avoid a collision. This also would allow an alternative way to access and manipulate a graphical object which was quite narrow where the control handle is located.

One skilled in the art can also select a proximity threshold for determining when the displacement should begin to take place, as well as selecting an amount and direction of displacement to provide the desired effect. Finally, one skilled in the art can select whether or not to move the pointing device along with the handle. In the preferred embodiment, there is no cursor tracking, that is, as the handle is displaced to the side, the cursor still moves on its original trajectory and if the user wishes to follow the position of the handle, the user must move the pointing device to track the displacement. In an alternative embodiment, if the cursor is positioned on or near a handle, as the handle is displaced sideways, the cursor moves with it automatically so as to retain more or less the same relative position in relation to the handle. Thus if a user selects a lower handle and moves it upward, as the handle moves to the left to avoid a collision, the cursor moves to the left by the same amount, even though the user is moving a pointing device (usually a mouse) only in the upward direction.

The user can also change the size of the selected object with the numeric field, any change is immediately reflected in the graphical display.

Sizing Alternatives

The application allows the resizing the object (the subunit or partition) only:

if the new object size is bigger than the allowable minimum size and smaller than the allowable maximum size for that type of object, and if the extra space can be allocated to, or removed from, another object. Maximum size varies with several parameters, including the addressable space which can be handled by the operating system and hardware. In one preferred embodiment, for Macintosh systems running System 7.1, the maximum size of an Apple HFS partition is 2 gigabytes and for Macintosh systems running System 7.5, the maximum size is 4 gigabytes. For a Macintosh system running System 7.5.2 or greater, the maximum size is in the terabyte range. The minimum space may be set to 1 (one) megabyte. For other types of partitions, other maxima and minima may be appropriate. For example, for an Apple ProDOS partition, there is a maximum size of 32 megabytes. For an MS-DOS partition, other considerations, particularly addressable address space, may limit the useful maximum size. One skilled in the art can readily determine the effective useful maximum for any particular type of partition and can modify an application accordingly. Extra space preferably includes a "free-space object" which is available within the fixed space but has not been allocated by the partitioning scheme.

If the resizing cannot be completed, the application resizes the selected object up to the maximum space, or the minimum space, available under the constraints listed above.

If the user drags the lower handle, the extra space is allocated to, removed, in order of priority:

a) from a "free-space object" below the selected object, (generally below all defined objects), and b) where no "free-space object" is available, from one of the objects below the selected object (starting with the object immediately below the selected object).

For example, referring to FIG. 8, the default partitioning for 5 partitions in an available space of 121 megabytes is 24 megabytes each. Referring to FIGS. 9A through 9D, if the user selects partition three and drags the lower handle down, this will increase the space allocated to partition "untitled 3". This space will come first from partition 4 (because the free-space object is already minimized), decreasing the size of partition 4 (compare FIG. 8 and FIG. 9A). If the user then drags the lower handle of partition 3 upwards, the size of partition 4 will not change, but the starting point (and ending point) will be raised to remain contiguous with partition 2 (FIG. 9B). Any additional contiguous partitions (here partition 5) will also follow along. Thus, if the lower handle of partition 3 is moved upward, this will expand or create a free space object ("extra") below the bottom-most partition (here, partition 5). If the lower handle of partition 3 is again moved downward, any needed space will first come from the free-space object until it is depleted (to its minimum size), and any additional space will be taken from the partition closest to the lower handle, here partition 4. This continues until partition 4 reaches a minimum allowed size, here 1 megabyte. If the user continues to drag the lower handle of partition 3 to further expand the partition, any additional needed space will come from partition 5, as needed (see FIG. 9C), with a limit reached when partition 5 reaches a minimum size. If the lower handle of partition 3 is again moved upwards, partition 4 remains at its minimum size, partition 5 remains at its most recent size, any recovered space increases the free-space object, and each of partitions 4 and 5 follow the handle movement upwards to keep the partitions contiguous (FIG. 9D). To generalize, when a user drags the lower handle of a partition downward, needed space will come from one or another partition below, but if the handle is raised, any changes in lower partitions will be maintained. One skilled in the art could design an allocation scheme in which space would be restored as a primary option rather than preserving the changes.

If the user drags the upper handle, the extra space is allocated to, removed from, in order of priority:

a) a "free-space object" above the selected object, b) one of the objects above the selected object (starting with the object immediately above the selected object).

Figure 11:
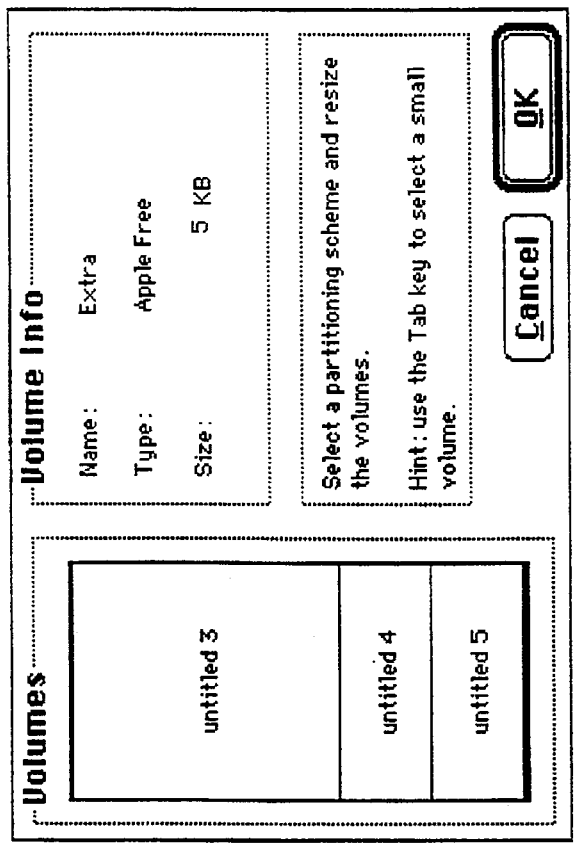
FIG. 11 illustrates using the tab key to access a small partition.
Figure 10A:
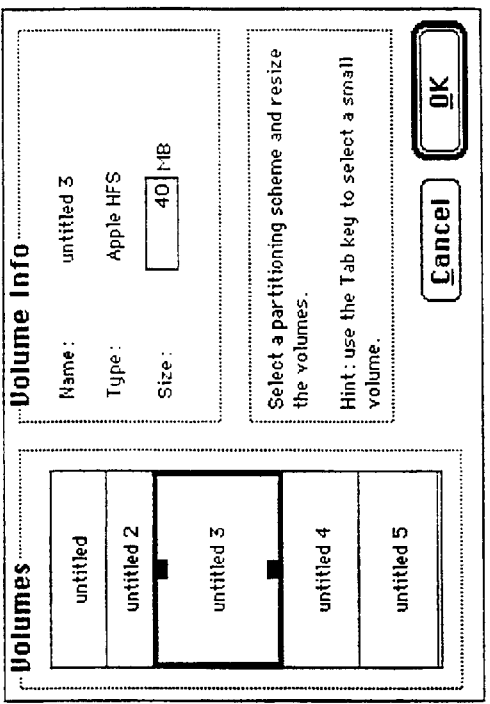
FIG. 10A, 10B, 10C, and 10D illustrate the effect of adjusting the upper handle of an active partition.
Figure 10C:
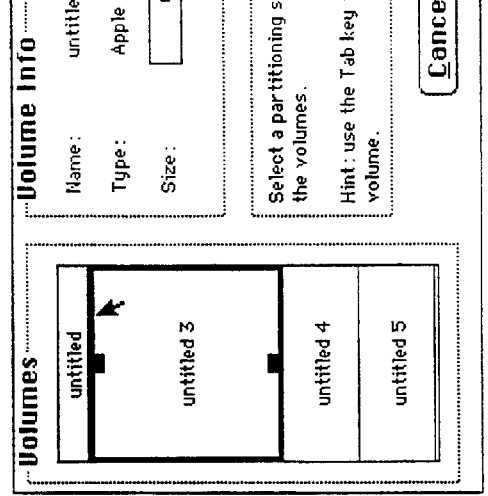
Figure 10B:
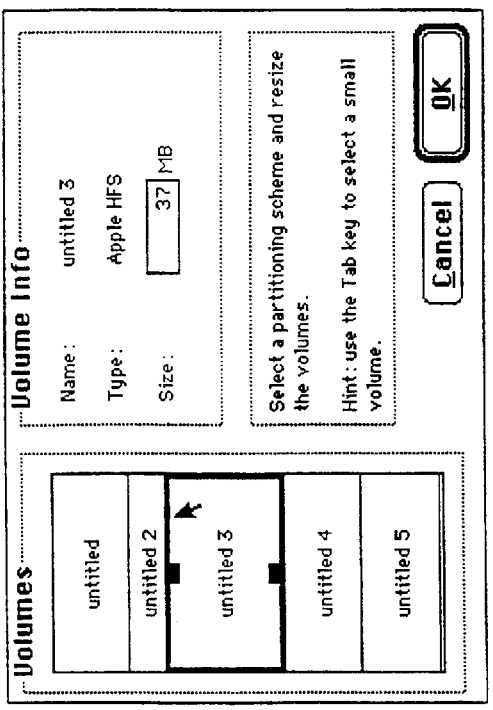
Figure 10D:
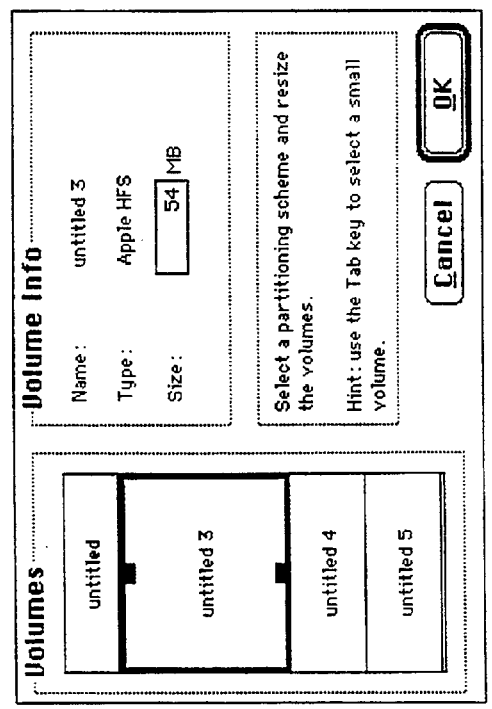

For example, referring to FIGS. 10A through 10D, if the user drags the upper handle of partition 3 upward, this will increase the space allocated to partition 3 (compare FIG. 8 and FIG. 10A). Since there is no free-space object above partition 3, this space will be taken from partition 2, reducing the size of that partition. This process will continue until partition 2 reaches a minimum size, one megabyte in a preferred embodiment. If the user continues to drag the handle upward, space will be taken from the next higher adjacent partition, here partition 1 (FIG. 10B). However, if the user drags the upper handle down, this will decrease the size of partition 3 and simultaneously lower the lower bound of the closest adjacent upper partition, here partition 2, enlarging the partition (FIG. 10C). Although partition 2 was at a minimum in FIG. 10B, too small to be seen, it is still present at its minimum size. The upper bound of partition 2 can be adjusted and refined until partition 2 and/or partition 3 is a desired size. If the user drags the upper handle upward to reduce partition 2 to a minimum and continues to move upward, more space will be taken from partition 1 (FIG. 10D) until partition 1 reaches its minimum size (FIG. 11).

To generalize, when a user drags the upper handle of a partition upward, needed space will come first from the closest adjacent partition. If a user drags an upper handle downward, this will increase the space of the immediately adjacent upper partition and moving the handle up and down will adjust the space allocated between the active partition and the immediately adjacent upper partition without changing the upper limit of the adjacent upper partition or the lower limit of the active partition. If the user drags the upper handle upward until the immediately adjacent upper partition reaches a minimum size, then any additional space needed will come from the next higher adjacent partition. Space taken from a non-adjacent upper partition will not be restored to that partition unless that partition or one of its neighbors is activated and adjusted.

If the user edits the numeric field to resize the object, the extra space is allocated to, or removed from, in order of priority:

a) a "free-space object" below the selected object, b) a "free-space object" above the selected object, c) one of the objects below the selected object (starting with the object immediately below the selected object), d) one of the objects above the selected object (starting with the object immediately above the selected object).

In the preferred embodiment, the presence of the editable numeric field, and the presence of information on the selected object, focuses clearly the attention of the user on that object and not on the separation between two contiguous objects. Compare the visual appearance of the active partition and the varying, corresponding values of the numeric size 6 in many of the figures.

The user can still select a partition which is too small to be seen by repeatedly pressing the tab key. Referring to FIG. 11, note that partitions 1 and 2 are not shown. By selecting one of the visible partitions, such as partition 3, and pressing the tab key, the "active" window cycles through the available windows. The first small window follows partition 5—it is the free-space object. The numeric size 6 is displayed in the "Volume Info" display, here 5 kilobytes. Note that there is no box around the "5" for size of the "extra" partition—this can not be modified directly by the user. Pressing the tab key again cycles the user through some of the driver and volume information partitions until partition 1 is selected (not shown).

Figure 12B:
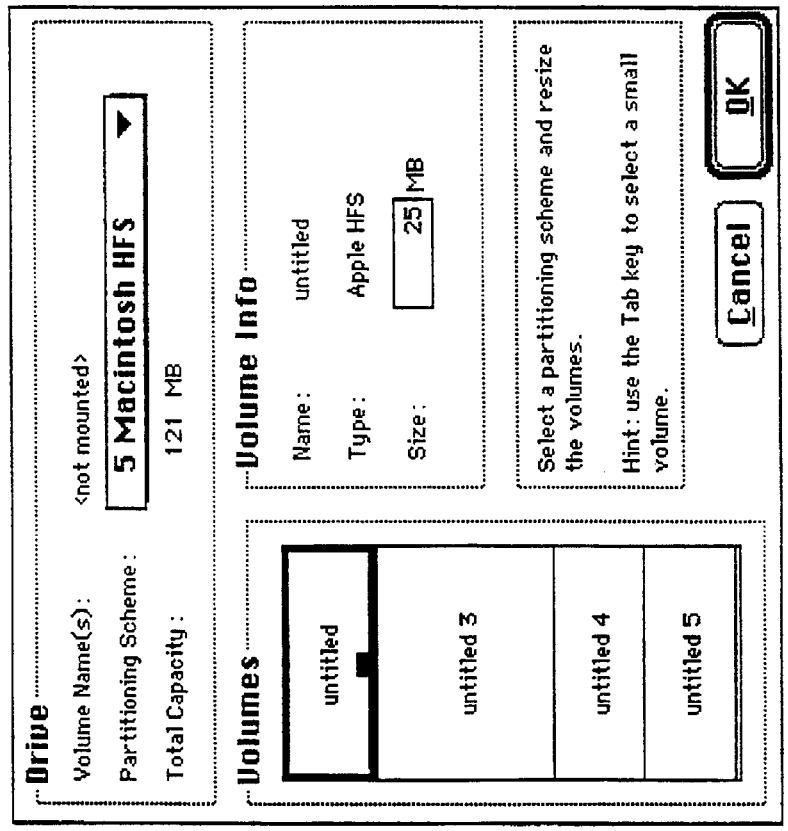
FIGS. 12A and 12B illustrate entering a size for a partition directly in the "Size" box.
Figure 12A:
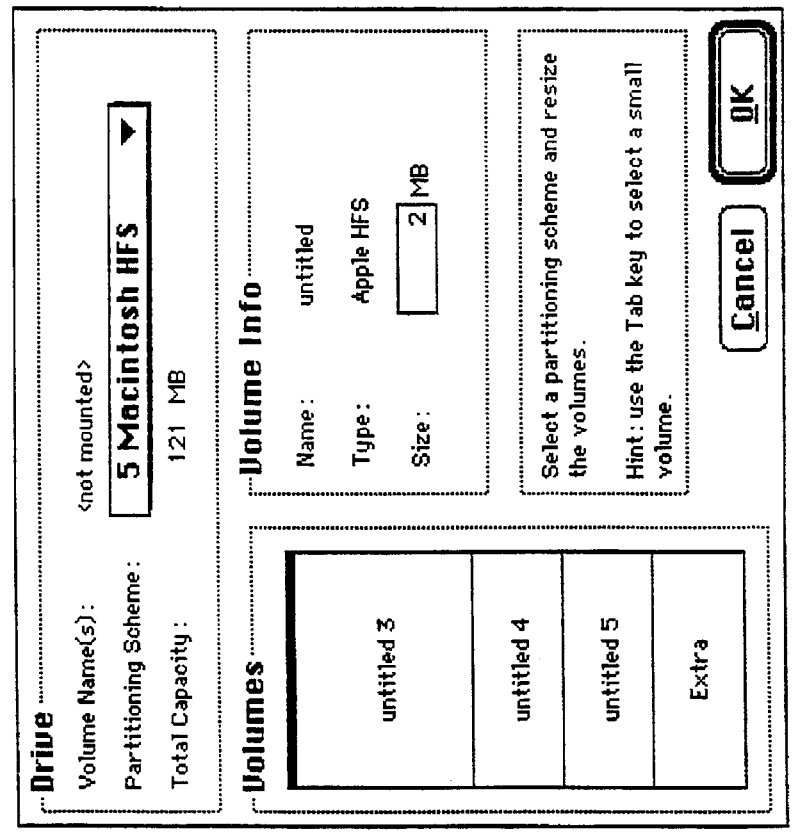

By typing a number directly into numeric size 6 box, that value is immediately assigned. Typing "2" in the box grows partition 1 ("untitled") to the thickness of a visible line, approximately 3 pixels in FIG. 12A. Typing a "5" after the "2" immediately grows the active partition to 25 megabytes, shown visibly as approximately 20% of the available 121 megabytes (FIG. 12B).

This invention provides some advantages over prior-art user interfaces that do somewhat related things. For example, in the case of resizing a spreadsheet row in at least one prior art application: a row does not need to be selected to be resized; no handles are displayed in the borders of the row; if a row is selected and its top border is moved, the previous row is resized and the selected row is not resized at all (which is counter-intuitive); and the total sum of all the row heights is not a constant.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A collision avoidance system for controlling the position of handles used to manipulate a graphical object, said system comprising a graphical object with a first and a second portion which can be brought into close proximity, a first handle for controlling the position of said first portion, said first handle at a primary position relative to and associated with said first portion, a second handle for controlling the position of said second portion, said second handle at a primary position relative to and associated with said second portion, a proximity detection mechanism for detecting when said first handle and said second handle would touch if brought too closely together, a displacement mechanism for moving said first handle away from its primary position when the proximity detection mechanism detects a potential collision.

2. The collision avoidance system of claim 1 wherein said first handle extends into the interior of said graphical object.

3. The collision avoidance system of claim 1 wherein said second handle extends into the interior of said graphical object.

4. A method of avoiding a collision between handles used to manipulate a graphical object, said method comprising providing a graphical object with a first and a second portion which can be brought into close proximity, providing a first handle for controlling the position of said first portion, said first handle at a primary position relative to and associated with said first portion, providing a second handle for controlling the position of said second portion, said second handle at a primary position relative to and associated with said second portion, detecting when said first handle and said second handle would touch if brought too closely together, moving said first handle away from its primary position when a potential collision is detected.

5. A computer program stored on a computer readable medium, for avoiding a collision between handles used to manipulate a graphical object, said program comprising the steps of providing a graphical object with a first and a second portion which can be brought into close proximity, providing a first handle for controlling the position of said first portion, said first handle at a primary position relative to and associated with said first portion, providing a second handle for controlling the position of said second portion, said second handle at a primary position relative to and associated with said second portion, detecting when said first handle and said second handle would touch if brought too closely together, moving said first handle away from its primary position when a potential collision is detected.

* * * * *